(12) United States Patent
Nir (10) Patent No.: US 6,236,775 B1
(45) Date of Patent: May 22, 2001

(54) INTEGRATED OPTICAL SWITCH ARRAY

(75) Inventor: David Nir, Tel Aviv (IL)

(73) Assignee: Lynx Photonic Networks Inc., Agoura Hills, CA (US)

( * ) Notice: Subject to any disclaimer, the term of this patent is extended or adjusted under 35 U.S.C. 154(b) by 0 days.

(21) Appl. No.: 09/085,369

(22) Filed: May 19, 1998

(51) Int. Cl.[7] .................................................. G02B 6/26
(52) U.S. Cl. ........................ 385/17; 385/16; 385/20; 385/24; 385/129; 359/117
(58) Field of Search ................... 385/16–24, 31, 385/44, 45, 46, 50, 129, 132; 359/117, 128; 370/357, 362, 360

(56) References Cited

U.S. PATENT DOCUMENTS

| | | |
|---|---|---|
| 3,871,743 | 3/1975 | Fulenwider . |
| 3,941,927 | 3/1976 | Russell . |
| 4,120,560 | 10/1978 | Baues et al. . |
| 4,618,210 | 10/1986 | Kondo . |
| 4,787,692 * | 11/1988 | Spanke ................................. 385/16 |
| 4,787,693 | 11/1988 | Kogelnik et al. . |
| 4,822,124 | 4/1989 | Suzuki . |
| 5,002,355 * | 3/1991 | Caron ................................... 385/16 |
| 5,010,542 * | 4/1991 | Pfaff ..................................... 385/17 |
| 5,050,951 | 9/1991 | Caron et al. . |
| 5,059,008 | 10/1991 | Flood et al. . |
| 5,182,554 | 1/1993 | Kaiser et al. . |
| 5,233,453 | 8/1993 | Sivarajas et al. . |
| 5,345,326 | 9/1994 | Araki . |
| 5,367,584 | 11/1994 | Ghezzo et al. . |
| 5,493,435 * | 2/1996 | Philip et al. ......................... 359/117 |
| 5,524,154 * | 6/1996 | Bergland et al. ..................... 385/17 |
| 5,546,209 | 8/1996 | Willner et al. . |
| 5,604,617 | 2/1997 | Burton . |
| 5,706,374 * | 1/1998 | Vinchant ............................... 385/16 |
| 5,729,642 | 3/1998 | Thaniyavarn . |
| 5,937,117 * | 8/1999 | Ishida et al. ......................... 385/24 |
| 6,005,698 * | 12/1999 | Huber et al. ......................... 385/17 |
| 6,067,389 * | 5/2000 | Fatehi et al. ......................... 385/17 |

OTHER PUBLICATIONS

Schmidt, R.V., Integrated Optics Switches and Modulators, Hughes Research Laboratories, 3011 Malibu Canyon Rd., Malibu, CA 90265.

Schlaak, H.F., "Modulation Behavior of Integrated Optical Firectiona Couplers", J. Opt. Commun., 5 (1984) 4: 122–131.

* cited by examiner

Primary Examiner—Hemang Sanghavi
(74) Attorney, Agent, or Firm—Mark M. Friedman (57) ABSTRACT

An optical switch array in which a plurality of input waveguides is coupled to a plurality of output waveguides. All but one of the output waveguides is coupled to each of the input waveguides by a switching element such as a 1×2 switch. A combining mechanism couples all the input waveguides to each of the output waveguides. In one preferred embodiment, one of the input waveguides continues directly into the output waveguide that is not coupled to input waveguides by switching elements, and each combining mechanism includes, for each of the other input waveguides, a coupling element such as a y-junction combiner. The switching elements are connected to the corresponding combining mechanisms by intermediate waveguides. Intermediate waveguides intersect input waveguides as required to allow the array to be fabricated as a planar integrated device.

20 Claims, 7 Drawing Sheets

INTEGRATED OPTICAL SWITCH ARRAY

FIELD AND BACKGROUND OF THE INVENTION

The present invention relates to optical switch arrays and, more particularly, to an integrated optical switch array in which arbitrary combinations of the inputs and outputs are explicitly addressable.

Integrated optical switches are well-known. For an early review of the art, see Lars Thylen, "Integrated optics in $LiNbO_3$: recent developments in devices for telecommunications", *Journal of Lightwave Technology* vol. 6 no. 6 (June 1988), pp. 847–861. Waveguides are created in a lithium niobate substrate by processing the substrate locally to increase the index of refraction. For example, the index of refraction of lithium niobate may be increased locally by diffusing titanium into the substrate. To divert light from one waveguide to another, the waveguides are coupled by local optoelectrical manipulation of their indices of refraction. Well-known examples of optoelectrical switches include directional couplers, BOA couplers, digital optical switches and x-switches. Depending on the voltage applied to such a switch, light is thus partly or completely diverted from an input waveguide to an output waveguide.

Figure 1A:
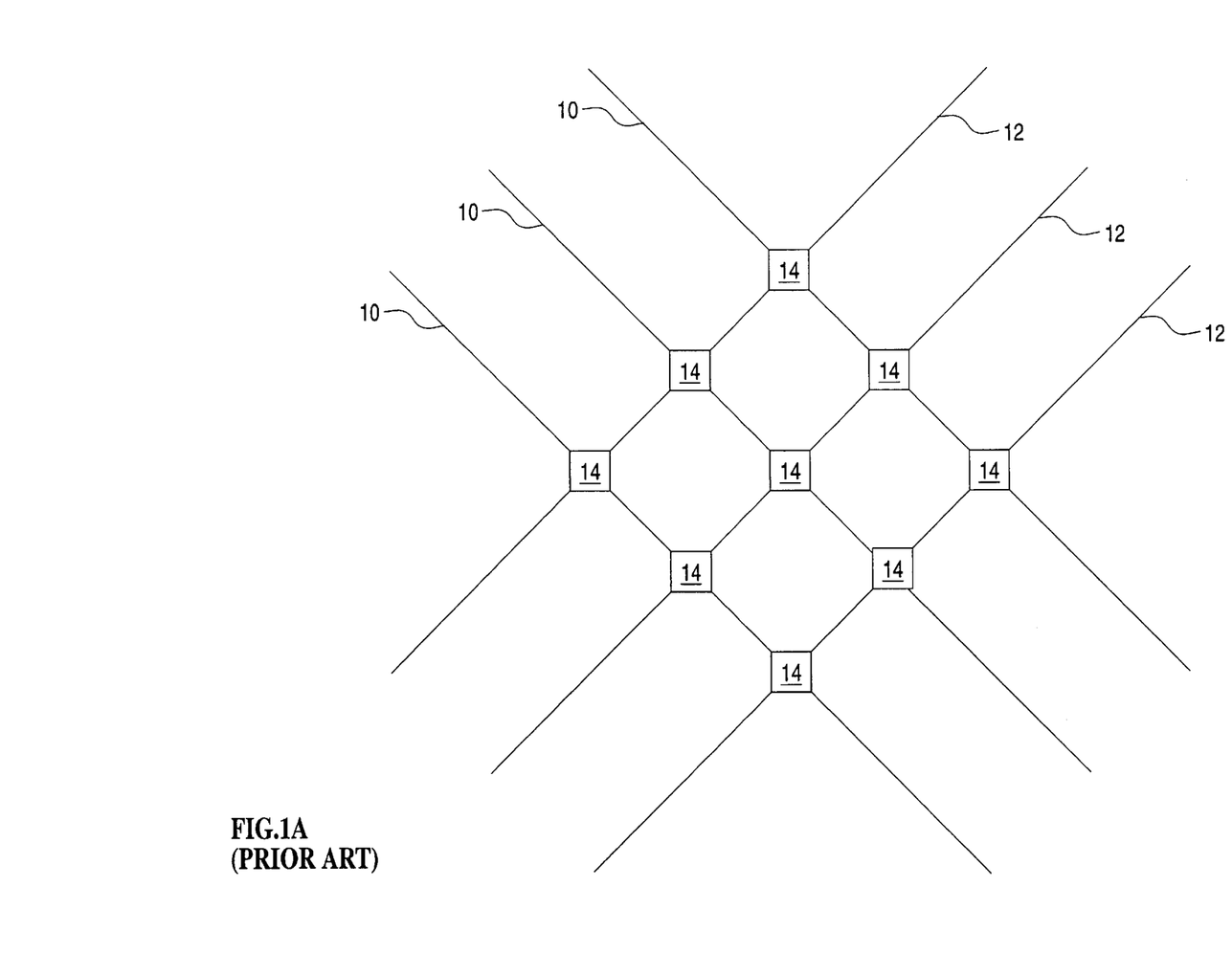
FIG. 1A (prior art) is an illustration of a crossbar switch array.

By appropriately combining waveguides and switches, a switch array is formed to switch light from a plurality of input waveguides among a plurality of output waveguides. A variety of switch geometries are known. FIG. 1A is a conceptual illustration of a switch of one such geometry: crossbar geometry. A set of input waveguides 10 crosses a set of output waveguides 12. At the crossing points, the waveguides are coupled by 2×2 switches 14. For simplicity, only three input waveguides 10 and three output waveguides 12 are shown in FIG. 1A. Typically the numbers of input waveguides 10 and output waveguides 12 are equal powers of 2, up to a practical maximum of 32.

Figure 1B:
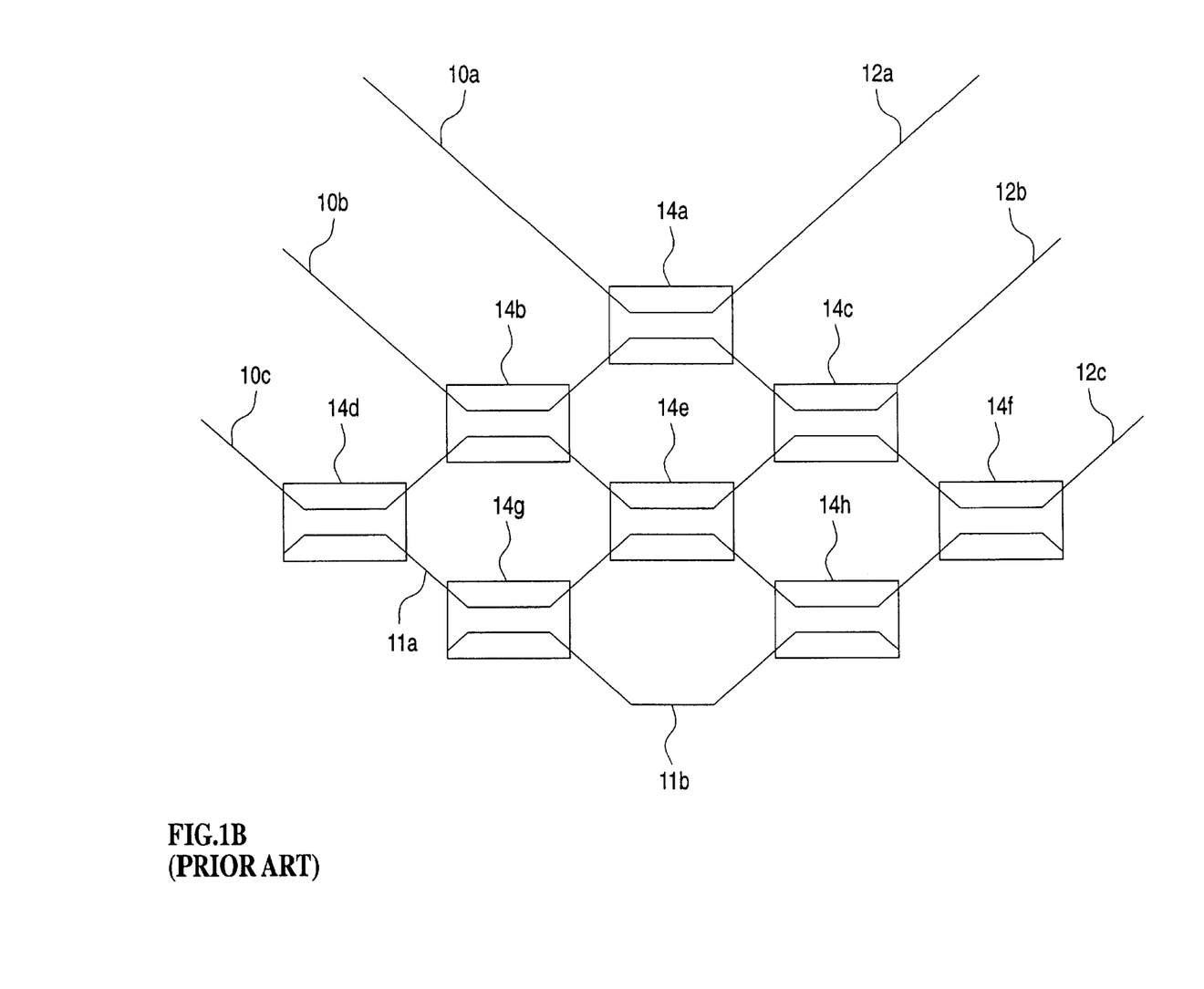
FIG. 1B (prior art) is a schematic depiction of the layout of the crossbar switch array of FIG. 1A.

FIG. 1B shows, schematically, the actual layout of the switch array of FIG. 1A. Switches 14 are shown as directional couplers, in which parallel segments of the waveguides are flanked by electrodes (not shown) to which the coupling voltages are applied. Note that input waveguide 10a leads directly into output waveguide 12a, that input waveguide 10b leads directly into output waveguide 12b, and that input waveguide 10c leads directly into output waveguide 12c. To allow arbitrary coupling of inputs to outputs, two auxiliary waveguides 11a and 11b are provided. Waveguides 10a–12a and 10b–12b are coupled in switch 14a. Waveguides 10b–12b and 10c–12c are coupled in switches 14b and 14c. Waveguides 10c–12c and 11a are coupled in switches 14d, 14e and 14f. Waveguides 11a and 11b are coupled in switches 14g and 14h. Note that switches 14d and 14g actually are 1×2 switches, that switches 14f and 14h actually are 2×1 switches, and that there is no switch corresponding to the lowermost 2×2 switch 14 of FIG. 1A. (A 1×2 switch is a 2×2 switch with one input deactivated; a 2×1 switch is a 2×2 switch with one output deactivated.) Switch arrays based on geometries such as the crossbar geometry of FIGS. 1A and 1B can be used to divert input signals to output channels arbitrarily. Signals from any input channels can be directed to any output channel, and even to multiple output channels, in broadcast and multicast transmission modes. One drawback of known optical switch array configurations is that it is difficult to determine how to configure the switch to achieve a desired coupling of input and output channels. In general, in order to configure a switch array as desired, on the order of N! switch combinations may have to be tested computationally to find the desired combination. In large switch arrays, the time required for this computation is the rate limiting factor in switch array speed.

In the days before integrated optics, Fulenwider, in U.S. Pat. No. 3,871,743, described an optical switch array in which input optical fibers are coupled explicitly to output optical fibers. Each input optical fiber is coupled to each output optical fiber by only two "input ports". In such a switch geometry, the amount of time needed to decide which "input ports" to activate to achieve arbitrary coupling of inputs to outputs is linear in the number of coupled channels. Unfortunately, the particular embodiment described by Fulenwider is not well-suited to fabrication as an integrated optical device.

There is thus a widely recognized need for, and it would be highly advantageous to have, an integrated optical switch array, for arbitrary coupling of input channels to output channels, in which the computational burden is linear in the number of coupled channels.

SUMMARY OF THE INVENTION

According to the present invention there is provided an optical switch array including: (a) a plurality of input waveguides; (b) a plurality of output waveguides; (c) for each of the output waveguides other than a last the output waveguide: for each of the input waveguides, a switching element coupling the each input waveguide to the each output waveguide; and (d) for each of the output waveguides, a combining mechanism for coupling all of the input waveguides to the each output waveguide; the input waveguides, the output waveguides, the switching elements and the combining mechanism all being arranged substantially in a common plane.

According to the present invention there is provided a method for switching signals from at least one input channel among a plurality of output channels, each output channel receiving signals from only one input channel, including the steps of: (a) providing an optical switch array including: (i) a plurality of input waveguides, each of the input waveguides corresponding uniquely to one of the input channels, (ii) a plurality of output waveguides, each of the output waveguides corresponding uniquely to one of the output channels, (iii) for each of the output waveguides other than a last the output waveguide: for each of the input waveguides, a switching element coupling the each input waveguide to the each output waveguide, and (iv) for each of the output waveguides, a combining mechanism for coupling all of the input waveguides to the each output waveguide, the input waveguides, the output waveguides, the switching elements and the combining mechanism all being arranged substantially in a common plane; and (b) for each of the output waveguides other than the last output waveguide: setting the switching element, that couples the each output waveguide to the input waveguide that corresponds to the input channel wherefrom a signal is to be switched to the output channel corresponding to the each output waveguide, to divert at least a portion of the signal to the each output waveguide.

According to the present invention there is provided a method for multicasting from at least one input channel to a plurality of output channels, each output channel receiving input from only one input channel, including the steps of: (a) providing an optical switch array including, for each of the output channels other than a last output channel, and for each input channel, a switching element coupling the each output channel to the each input channel; (b) for each output channel other than the last output channel: setting the switching element, that couples the each output channel to the input channel wherefrom a signal is to be switched to the each output channel, to divert at least a portion of the signal to the each output channel, at least one of the switching elements being set to divert only a portion of the signal.

The present invention is based on the realization that a switch array geometry similar to Fulenwider's can in fact be fabricated, essentially in a single plane, as an integrated optical device, for example, on a Z-cut lithium niobate substrate. As in the prior art configuration of FIG. 1B, one of the input waveguides continues directly into one of the output waveguides. All but one of the output waveguides is coupled to each of the input waveguides by a switching element such as a 1×2 switch. A combining mechanism couples all of the input waveguides to each output waveguide. In one preferred embodiment of the present invention, one of the input waveguides continues directly, as in the prior art configuration of FIG. 1B, into the output waveguide that is not coupled to input waveguides by switching elements, and each combining mechanism includes, for each of the other input waveguides, a coupling element such as a y-junction combiner which may be either passive or active. The switching elements are connected to the corresponding combining mechanism by intermediate waveguides that cross intervening input waveguides as necessary. To preserve the planarity of the array, the intermediate waveguides intersect the input waveguides at the crossing points.

To switch signals from an input channel, associated uniquely with a corresponding input waveguide, to one or more output channels, each output channel associated uniquely with a corresponding output waveguide, the output waveguides that are coupled to input waveguides by switching elements are considered in turn. For each of these target output waveguides, the switching element that couples the input waveguide associated with the desired input channel is set to divert the appropriate portion of the input signals of that channel to the target waveguide. If signals from other input channels are to be switched to other output waveguides, then the corresponding other switching elements associated with the target output waveguide are set to pass those signals without diversion.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an integrated optical switch array in which each input channel is connected explicitly to each output channel in a way that allows straightforward selection of switching elements corresponding to arbitrary combinations of input channels with output channels. The present invention can be used to switch among arbitrary combinations of input channels and output channels faster than known optical switch arrays.

The principles and operation of an integrated optical switch according to the present invention may be better understood with reference to the drawings and the accompanying description.

Figure 2:
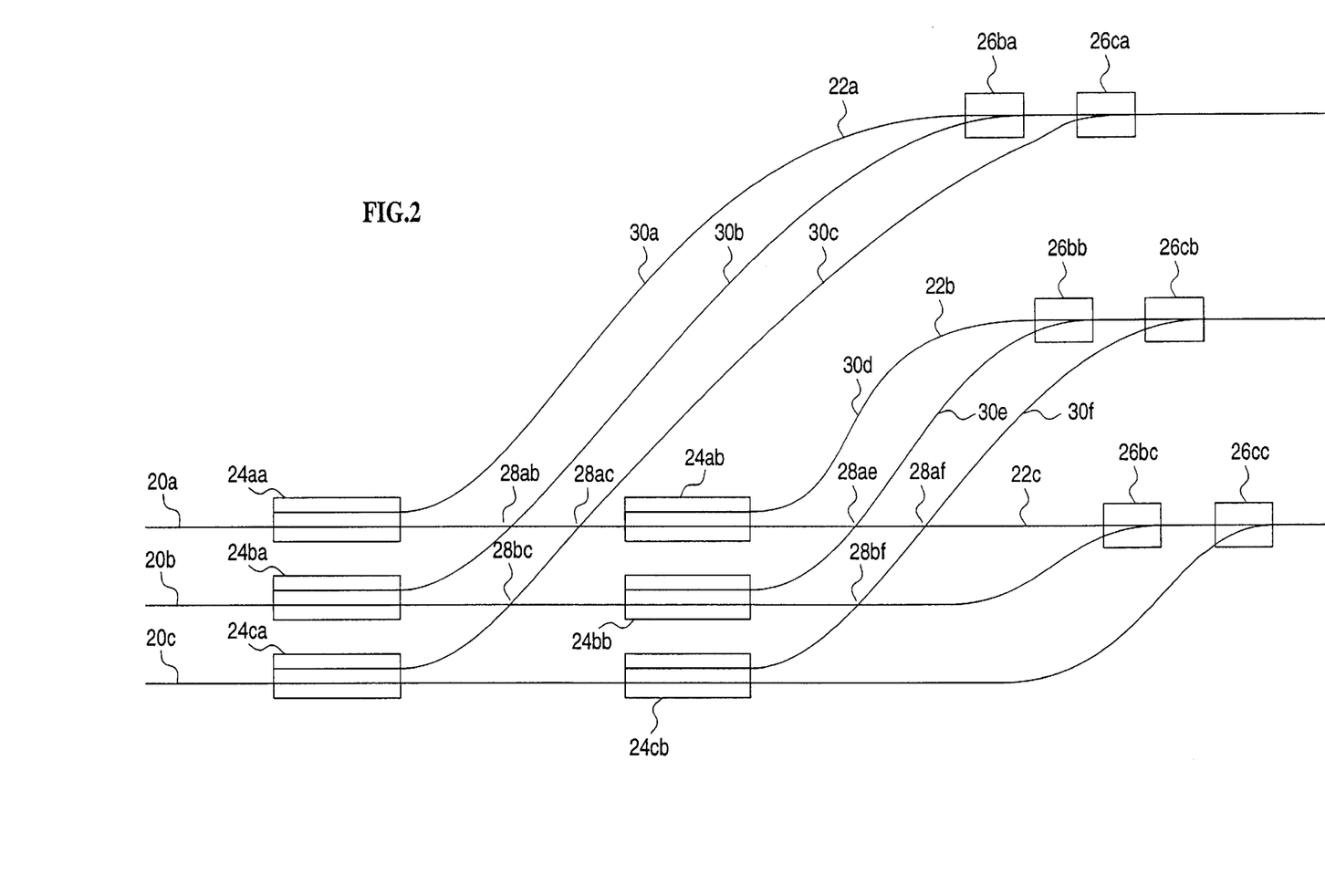
FIG. 2 schematic diagram of an optical switch array of the present invention.

Referring now to the drawings, FIG. 2 is a schematic diagram of an optical switch array of the present invention, for coupling input waveguides 20a, 20b and 20c to output waveguides 22a, 22b and 22c. Note that output waveguide 22c is a continuation of input waveguide 20a. Input waveguide 20a is also coupled to output waveguide 22a by a 1×2 switch 24aa via an intennediate waveguide 30a that continues directly into output waveguide 22a, and to output waveguide 22b by a 1×2 switch 24ab via an intermediate waveguide 30d that continues directly into output waveguide 22b. Input waveguide 20b is coupled to output waveguide 22a by a 1×2 switch 24ba and an intermediate waveguide 30b that merges into output waveguide 22a at a passive y-junction combiner 26ba. Input waveguide 20c is coupled to output waveguide 22a by a 1×2 switch 24ca and an intermediate waveguide 30c that merges into output waveguide 22a at a passive y-junction combiner 26ca. Input waveguide 20b is coupled to output waveguide 22b by a 1×2 switch 24bb and an intermediate waveguide 30e that merges into output waveguide 22b at a passive y-junction combiner 26bb. Input waveguide 20c is coupled to output waveguide 22b by a 1×2 switch 24cb and an intermediate waveguide 30f that merges into output waveguide 22b at a passive y-junction combiner 26cb. Input waveguide 20b merges into output waveguide 22c at a passive y-junction combiner 26bc. Input waveguide 20c merges into output waveguide 22c at a passive y-junction combiner 26cc.

Input waveguide 20a also is referred to herein as the "first" input waveguide because it is the first input waveguide in top-to-bottom order in FIG. 2. Similarly, output waveguide 22c also is referred to herein as the "last" output waveguide because it is the last output waveguide in top-to-bottom order in FIG. 2. Note that all output waveguides 22 except for last output waveguide 22c are coupled to input waveguides via 1×2 switches 24, and that all input waveguides 20 except for first input waveguide 20a are coupled to output waveguides 22 via passive y-junction combiners 26.

Waveguides 20 and 22, as well as 1×2 switches 24 and y-junction combiners 26, are fabricated by standard techniques, for example on the surface of a Z-cut lithium niobate crystal, essentially in a single plane. As a result, some of the intermediate waveguides intersect all but one of the input waveguides. Specifically, intermediate waveguide 30b intersects input waveguide 20a at intersection 28ab; intermediate waveguide 30c intersects input waveguide 20b at intersection 28bc and input waveguide 20a at intersection 2ac; intermediate waveguide 30e intersects in put waveguide 20a at intersection 28ae; and intermediate waveguide 30f intersects input waveguide 20b at intersection 28bf and input waveguide 20a at intersection 28af.

1×2 switches 24 are illustrative of switching elements for coupling input waveguides 20 to output waveguides 22b. The scope of the present invention includes all such switching elements. The particular 1×2 switches 24 illustrated in FIG. 2 are directional couplers. For simplicity, the electrodes of directional couplers 24 are not shown. As in the case of the prior art switch arrays, any suitable 1×2 witches, including BOA couplers, digital optical switches and x-switches, may be used as 1×2 switches 24.

Figure 3:
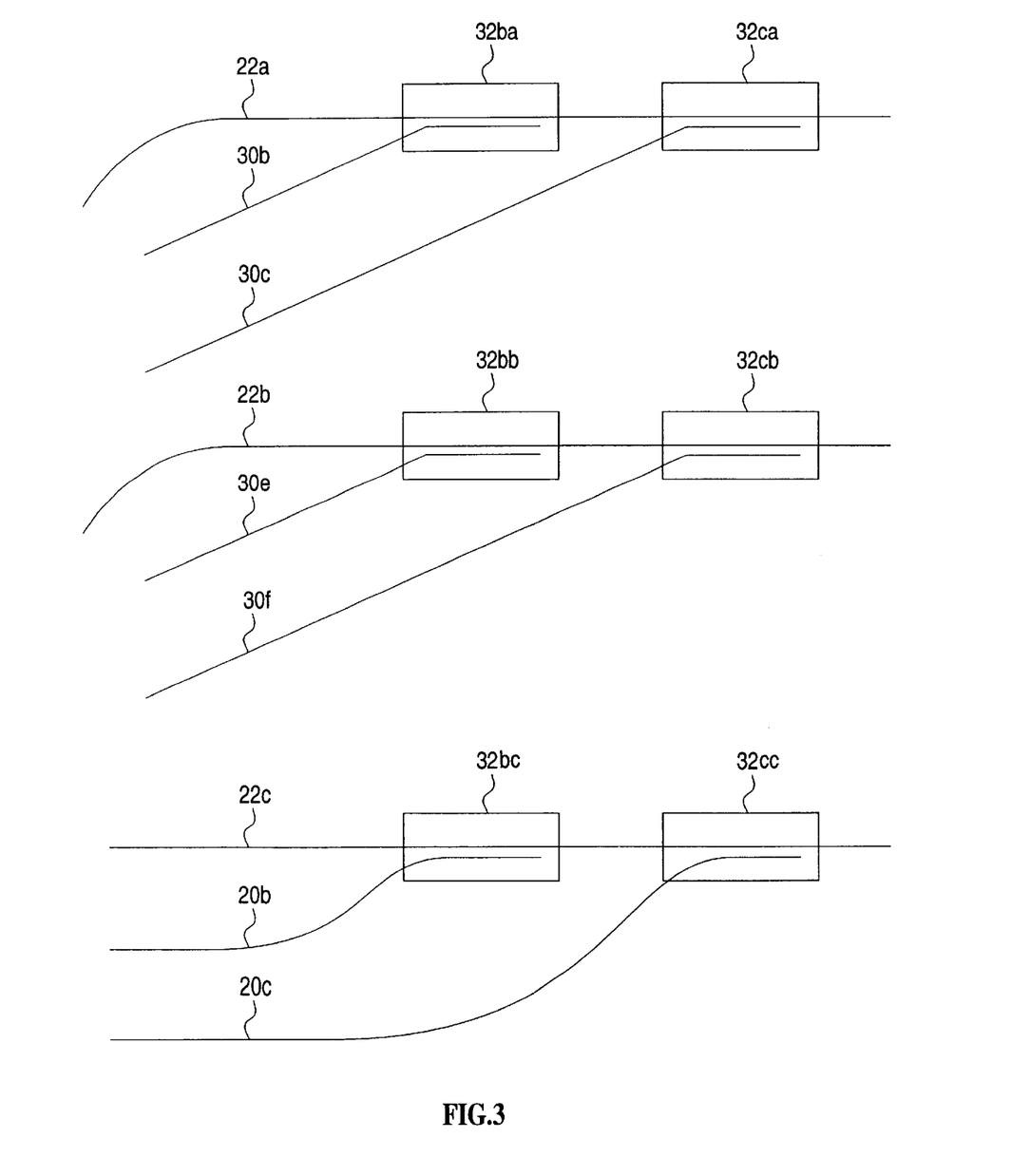
FIG. 3 is a partial schematic diagram of a variant of the optical switch array of FIG. 2.

Passive y junction combiners 26 are illustrative of coupling elements for coupling input waveguides 20 to output waveguides 22. The difference between a "switching element" and a "coupling element", as these terms are used herein, is that a coupling element may be either passive or active, whereas a switching element is necessarily active. FIG. 3 is a partial schematic diagram of a variant of the optical switch array of FIG. 2 in which the coupling elements are active coupling elements 32. Specifically, coupling elements 32 are 2×1 switches. 2×1 switch 32*ba* couples intermediate waveguide 30*b* to output waveguide 22*a*, 2×1 switch 32*ca* couples intermediate waveguide 30*c* to output waveguide 22*a*, 2×1 switch 32*bb* couples intermediate waveguide 30*e* to output waveguide 22*b*, 2×1 switch 32*cb* couples intermediate waveguide 30*f* to output waveguide 22*b*, 2×1 switch 32*bc* couples input waveguide 20*b* to output waveguide 22*c*, and 2×1 switch 32*cc* couples input waveguide 20*c* to output waveguide 22*c*. More specifically, 2×1 switches 32 are illustrated as directional couplers. For simplicity, the electrodes of directional couplers 32 are not shown. As in the case of 1×2 switches 24, 2×1 switches 32 may be any suitable 2×1 switches, including BOA couplers, digital optical switches and x-switches.

The advantage of passive couplers 26 over active couplers 32 is that in an optical switch using passive couplers 26, fewer active elements need to be addressed than in an optical switch using active couplers 32. The advantage of active couplers 32 over passive couplers 26 is that a passive coupler 26 requires an elaborate design geometry to prevent loss of part of the incoming radiation to a second order mode.

In the general case of N input waveguides 20 and M output waveguides 22, an optical switch array of the present invention includes N(M−1) switching elements 24, N−1)M coupling elements 26 or 32, and N(N−1)(M−1)/2 intersections 28.

Figure 4:
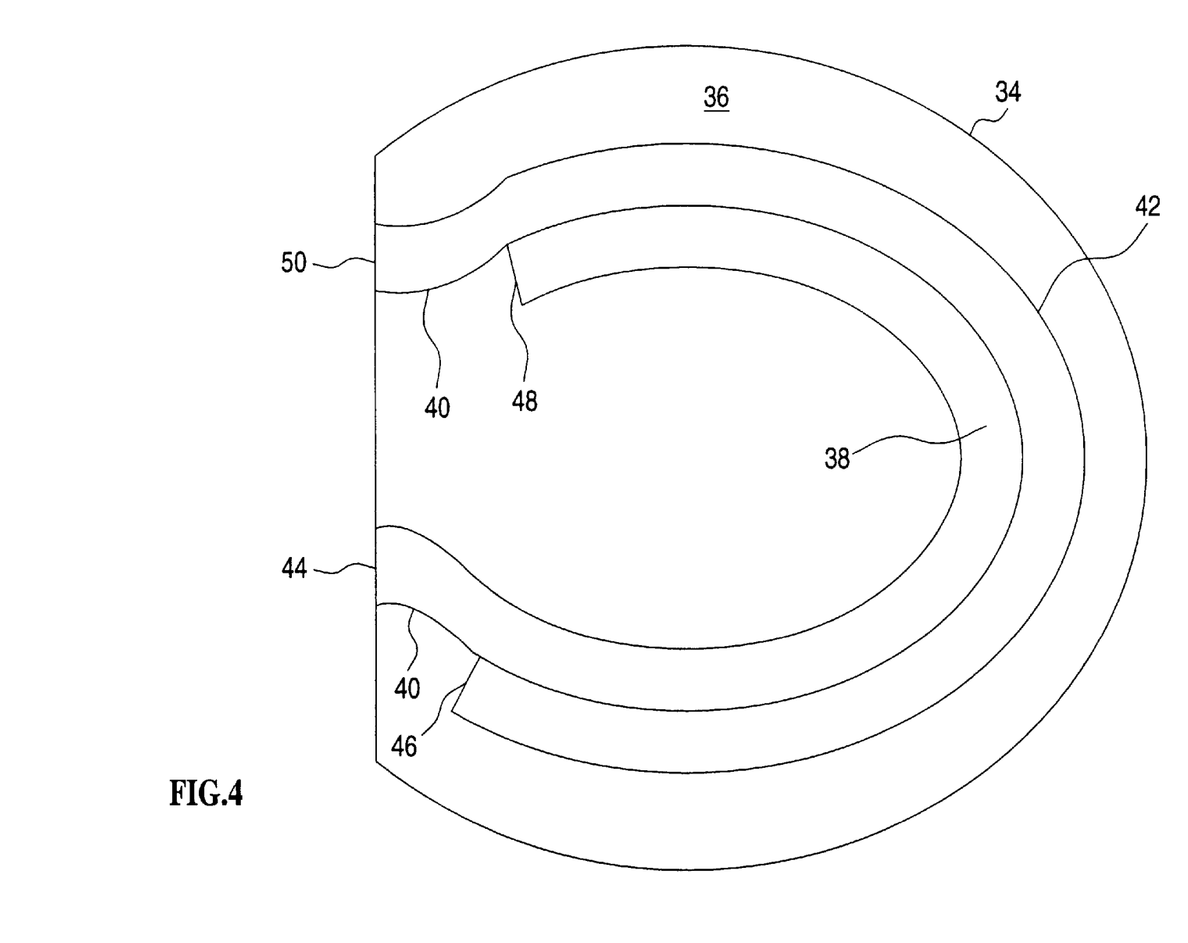
FIG. 4 shows the highest level layout of an optical switch of the present invention on the face of a Z-cut 4" lithium niobate crystal.

To switch optical signals from input waveguides 20 to output waveguides 22 efficiently, with minimal losses, implementations of the optical switches of FIGS. 2 and 3 must obey certain geometric constraints. These constraints depend on the wavelength of the light used. For the commonly used wavelength of 1550 nm, the following constraints apply: Except where coupled in switching elements 24 or coupling elements 26 or 32, waveguides 20, 22 and 30 should be at least about 0.5 mm apart. 1×2 switches 24 and 2×1 switches 32 typically are between 5 mm and 7 mm long. Parallel columns of 1×2 switches, for example the column including switches 24*aa*, 24*ba* and 24*ca* and the column including switches 24*ab*, 24*bb* and 24*cb*, should be at least about 1 mm apart. The intersection angle at intersections 28 should be such that input waveguides 20 and intermediate waveguides 30 are not coupled at intersections 28. The radii of curvature of the curved portions of waveguides 20, 22 and 30 should be at least 25 mm, and more preferably at least 30 mm. Within these geometric constraints, it is possible to fit as many as 32 input waveguides 20 and as many as 32 output waveguides 22 on the face of a Z-cut 4" diameter lithium niobate crystal. FIG. 4 shows, schematically, a face 36 of a Z-cut 4" diameter lithium niobate crystal 34 on which a 32×32 optical switch array of the present invention is fabricated. Input waveguides 20 run parallel from a first end 44 of an input waveguide zone 38 to a second end 48 of input waveguide zone 38. Output waveguides 22 run parallel from a first end 46 of an output waveguide zone 42 to a second end 50 of output waveguide zone 42. One waveguide 40 is common to both zone 38 and zone 40. Common waveguide 40 serves as both the "first" input waveguide and the "last" output waveguide. The circular arc length of zones 38 and 40 is about 200 mm, more than enough to accommodate 31 columns of switches 24.

Depending on the voltages applied to their electrodes, 1×2 switches 24 and 2×1 switches 32 may be placed in a straight-through state, in which the two channels of the switch are uncoupled, a crossover state, in which the two channels exchange signals, and any state in-between, for partial exchange of signals. In general, it is straightforward to select switch configurations to achieve any desired switching pattern of signals from input waveguides 20 to output waveguides 22. Switch configurations are selected by successive consideration of the desired output waveguides 22, taking advantage of the fact that each output channel receives input from only one input channel. For each output waveguide 22 except the last output waveguide 22, switch 24 that couples the desired input waveguide 20 to the target output waveguide 22 is set to the state that diverts the desired portion of the input signal to the target output waveguide 22, and, if necessary, some or all of the rest of switches 24 that couple to the target output waveguide 22 are set to the straight-through state. This applies both to ordinary switching, in which signals from each input channel is switched to only one output channel, and to multicasting, in which signals from one of the input channels are split among two or more output channels. An important special case of multicasting is broadcasting, in which signals from only one input channel are distributed among all the output channels.

For example, using the embodiment of FIG. 2, and associating channel a with waveguides 20*a* and 22*a*, channel b with waveguides 20*b* and 22*b*, and channel c with waveguides 20*c* and 22*c*, suppose that it is desired to direct input signals from channel a to output on channel b, input signals from channel b to output on channel c, and input signals from channel c to output on channel a. In the left column of switches 24, switch 24*ca* is set to the crossover state, while switches 24*aa* and 24*ba* are set to the straight-through state. In the right column of switches 24, switch 24*ab* is set to the crossover state, while switch 24*bb* is set to the straight-through state. The state of switch 24*cb* is arbitrary, because the entire incoming signal on channel c was diverted to channel a by switch 24*ca*.

Similarly, to broadcast equally from channel a to all three output channels, switch 24*aa* is set to divert ⅓ of the incoming signal and switch 24*ab* is set to divert ½ of the incoming signal. The states of the remaining switches 24 is arbitrary.

In this context, it should be noted that the switches used by Fulenwider, which consist of input gratings and acoustic beam steerers, can assume only the straight-through state and the crossover state. Partial diversion of a signal from one channel to another, as is necessary for multicasting, requires the use of more modem switches, such as the integrated optic switches used in the present invention.

Figure 5A:
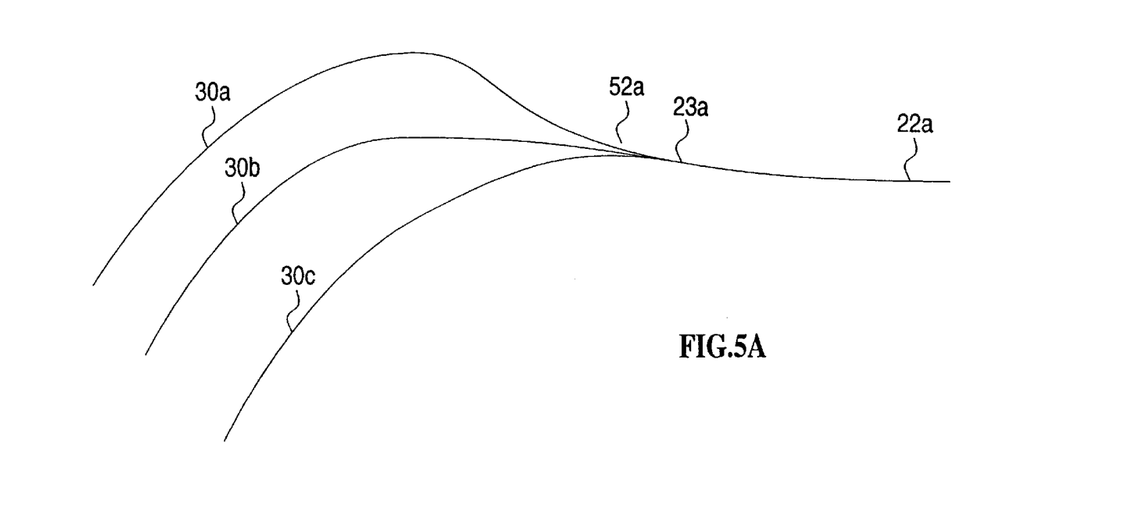
FIGS. 5A and 5B show alternate combining mechanisms.
Figure 5B:
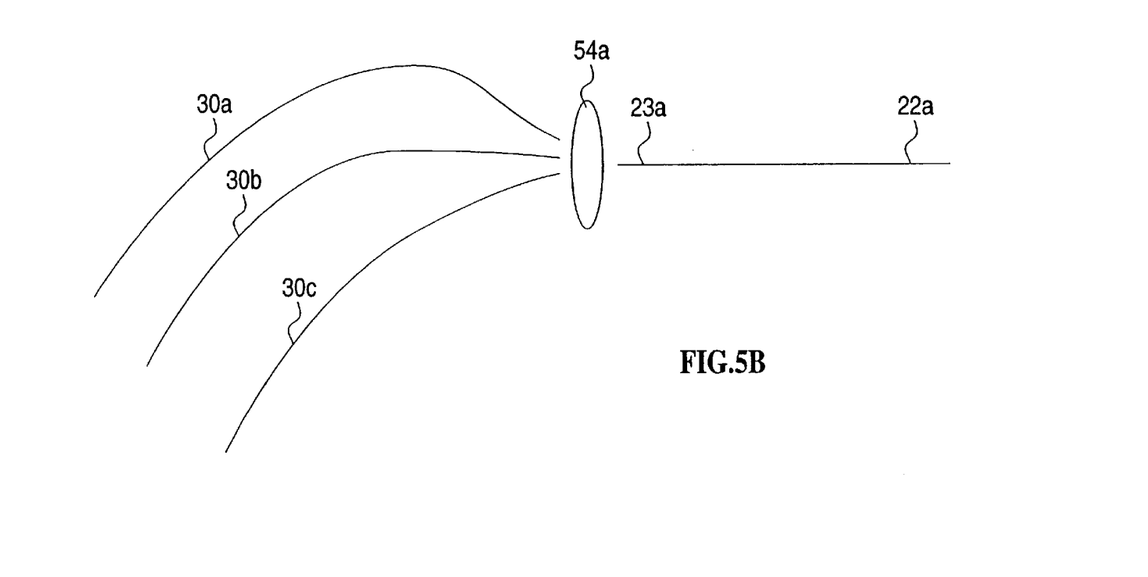

The crossover point between intermediate waveguide 30*a* and output waveguide 22*a*, together with either y-junction combiners 26*ba* and 26*ca* or y-junction combiners 32*ba* and 32*ca*, constitute a combining mechanism for coupling input waveguides 20 with output waveguide 22*a*. Similarly, the crossover point between intermediate waveguide 30*d* and output waveguide 22*b*, together with either y-junction combiners 26*bb* and 26*cb* or y-junction combiners 32*bb* and 32cb, constitute a combining mechanism for coupling input waveguides 20 with output waveguide 22b; and the crossover point between input waveguide 20a and output waveguide 22c, together with either y-junction combiners 26bc and 26cc or y-junction combiners 32bc and 32cc, constitute a combining mechanism for coupling input waveguides 20 with output waveguide 22c. FIGS. 5A and 5B show alternative combining mechanisms.

In FIG. 5A, intermediate waveguides 30a, 30b and 30c merge into a passive funnel structure 52a at input end 23a of output waveguide 22a. Similar funnel structures 52b and 52c (not shown) are provided for coupling intermediate waveguides 30d, 30e and 30f with output waveguide 22b, and for coupling input waveguides 20a, 20b and 20c with output waveguide 22c. Funnel structures 52 must be designed geometrically to minimize losses due to generation of high order modes at the funnel necks.

FIG. 5B shows intermediate waveguides 30a, 30b and 30c coupled to into input end 23a of output waveguide 22a by a planar lens 54a. Planar lens 54a may be fabricated in a lithium niobate substrate by proton exchange, to locally increase the index of refraction of the lithium niobate. Planar lens 54a is shown as a refractive lens. Alternatively, planar lens 54a may be a Fresnel lens. Similar planar lenses 54b and 54c (not shown) are provided for coupling intermediate waveguides 30d, 30e and 30f with output waveguide 22b, and for coupling input waveguides 20a, 20b and 20c with output waveguide 22c. It is easier to design and fabricate low loss structures based on planar lens 54 than those based on funnel structure 52.

Instead of basing the optical switch array of the present invention on waveguides fabricated in a lithium niobate substrate, the optical switch array of the present invention may be based on waveguides formed of a polymer such as benzocyclobutane, which is available, for example, from Dow Chemical Co. of Midland Mich., deposited on a glass substrate or on another polymer. Such waveguides may be formed by photolithography or by molding. The associated switching elements can be based on the thermo-optic effect or on the electro-optic effect.

Figure 6:
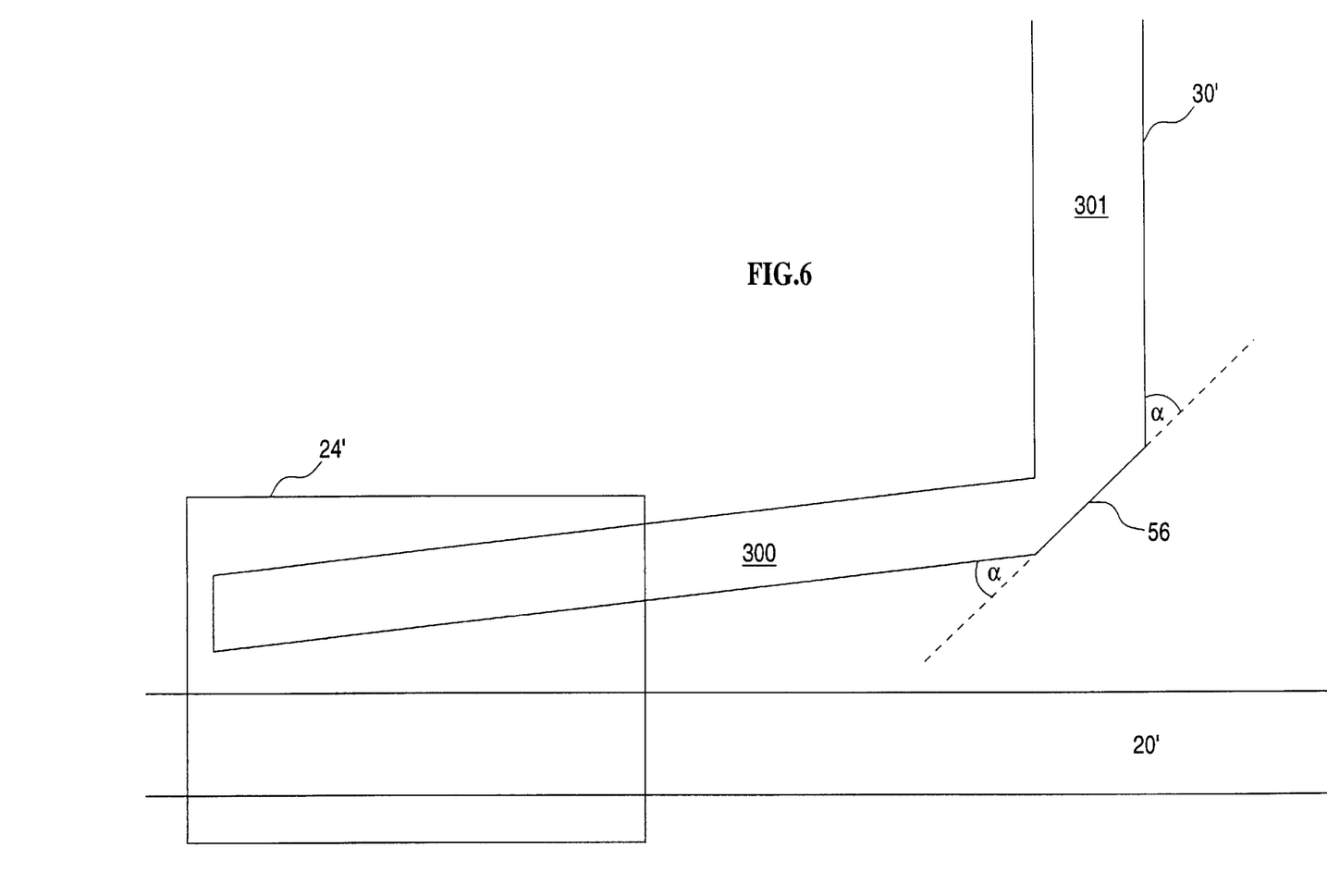
FIG. 6 shows coupled polymer waveguides, one of which includes a right-angle bend.

An advantage of molded polymer waveguides over titanium-diffused lithium niobate waveguides is illustrated in FIG. 6, which shows a 1×2 switch 24' coupling a polymer input waveguide 20' to a polymer intermediate waveguide 30'. As in the case of switches 24, the electrodes of switch 24' are not shown, for simplicity. Branches 300 and 301 of intermediate waveguide 30 meet at an intersection provided with a planar face 56. Because waveguides 24' and 30' are fabricated by molding, planar face 56 is an interface between polymer and air. If the polymer has an index of refraction n, there is total internal reflection at planar face 56 if angles $\alpha$ exceed $\arcsin(1/n)$. Benzocyclobutane has an index of refraction at 1550 nm of about 1.6, so $\alpha > 38°$ provides total internal reflection. In particular, $\alpha > 45°$ provides total internal reflection, and the paths of polymer waveguides can be laid out with right angles instead of the gentle (on a micron scale) curvature required for lithium niobate based waveguides. This allows polymer based optical switch arrays of the present invention to be fabricated with much higher densities and/or much larger numbers of input and output channels than lithium niobate based optical switch arrays of the present invention.

While the invention has been described with respect to a limited number of embodiments, it will be appreciated that many variations, modifications and other applications of the invention may be made.

What is claimed is:

1. An optical switch array comprising:
   (a) at least three input waveguides;
   (b) at least three output waveguides;
   (c) for each of said output waveguides other than a last said output waveguide:
      (i) a respective combining mechanism for coupling all of said input waveguides to said each output waveguide, and
      (ii) for each of said input waveguides, a respective switching element for coupling said each input waveguide to said each output waveguide via said respective combining mechanism; and
   (d) for said last output waveguide: only a respective combining mechanism for coupling all of said input waveguides to said last output waveguide:
   said input waveguides, said output waveguides, said switching elements and said combining mechanisms all being arranged substantially in a common plane; all of said input waveguides traversing successively said switching elements in a common order relative to said output waveguides.

2. The optical switch array of claim 1, further comprising:
   (e) for each of said output waveguides other than said last output waveguide:
      for each of said input waveguides, an intermediate waveguide connecting said respective switching element to said respective combining mechanism;
   all of said intermediate waveguides being arranged substantially in said common plane.

3. The optical switch array of claim 2, wherein each of said intermediate waveguides intersects at least one of said input waveguides.

4. The optical switch array of claim 3, wherein one of said at least one input waveguide intersected by said each intermediate waveguide is said first input waveguide.

5. The optical switch array of claim 1, wherein said switching elements are 1×2 switches.

6. The optical switch array of claim 5, wherein each of said 1×2 switches is selected from the group consisting of directional couplers, BOA couplers, digital optical switches and x-switches.

7. The optical switch array of claim 1, wherein each said combining mechanism includes, for each of said input waveguides other than a first of said input waveguides, a coupling element coupling said each input waveguide to said each output waveguide.

8. The optical switch array of claim 7, wherein said coupling elements are y-junction combiners.

9. The optical switch array of claim 8, wherein said y-junction combiners are passive.

10. The optical switch array of claim 8, wherein at least one of said y-junction combiners is active.

11. The optical switch array of claim 10, wherein said at least one active y-junction combiner is selected from the group consisting of directional couplers, BOA couplers, digital optical couplers and x-switches.

12. The optical switch array of claim 1, wherein each said combining mechanism includes a planar lens.

13. The optical switch array of claim 1, wherein said last output waveguide is a continuation of said first input waveguide.

14. A method for switching signals from at least one of at least three input channel to at least one of at least three output channels, each output channel receiving signals from only one input channel, comprising the steps of:

(a) providing an optical switch array including:
   (i) at least three input waveguides, each of said input waveguides corresponding uniquely to one of the input channels,
   (ii) at least three output waveguides, each of said output waveguides corresponding uniquely to one of the output channels,
   (iii) for each of said output waveguides other than a last said output waveguide:
      (A) a respective combining mechanism for coupling all of said input waveguides to said each output waveguide, and
      (B) for each of said input waveguides, a respective switching element for coupling said each input waveguide to said each output waveguide via said respective combining mechanism, and
   (iv) for said last output waveguide: only a respective combining mechanism for coupling all of said input waveguides to said last output waveguide,
said input waveguides, said output waveguides, said switching elements and said combining mechanisms all being arranged substantially in a common plane, all of said input waveguides traversing successively said switching elements in a common order relative to said output waveguides; and
   (b) for each of said output waveguides other than said last output waveguide:
      setting said switching element, that couples said each output waveguide to said input waveguide that corresponds to the input channel wherefrom a signal is to be switched to the output channel corresponding to said each output waveguide, to divert at least a portion of said signal to said each output waveguide.

15. The method of claim 14 further comprising the step of:
   (c) for said each output waveguide other than said last output waveguide:
      setting at least one other said switching element, that couples another of said input waveguides to said each output waveguide, to a straight-through state.

16. A method for multicasting from at least one of at least three input channels to at least two of at least three output channels, each output channel receiving input from only one input channel, comprising the steps of:
   (a) providing an optical switch array including:
      (i) at least three input waveguides, each of said input waveguides corresponding uniquely to one of the input channels,
      (ii) at least three output waveguides, each of said output waveguides corresponding uniquely to one of the output channels,
      (iii) for each of said output waveguides other than a last said output waveguide:
         (A) a respective combining mechanism for coupling all of said input waveguides to said each output waveguide, and
         (B) for each of said input waveguides, a respective switching element for coupling said each input waveguide to said each output waveguide via said respective combining mechanism,
said last output waveguide corresponding to a last output channel, and
      (iv) for said last output waveguide: only a respective combining mechanism for coupling all of said input waveguides to said last output waveguide,
said input waveguides, said output waveguides, said switching elements and said combining mechanisms all being arranged substantially in a common plane, all of said input waveguides traversing successively said switching elements in a common order relative to said output waveguides; and
   (b) for each output channel other than said last output channel:
      setting said switching element, that couples said each output channel to the input channel wherefrom a signal is to be switched to said each output channel, to divert at least a portion of said signal to said each output channel,
at least one of said switching elements being set to divert only a portion of said signal.

17. The method of claim 16, further comprising the step of:
   (c) for said each output channel other than said last output channel:
      setting at least one other said switching element, that couples another of the input channels to said each output channel, to a straight-through state.

18. An optical switch array comprising:
   (a) a plurality of input waveguides; and
   (b) a plurality of output waveguides:
      (i) all of said input waveguides being coupled to each of said output waveguides via a respective combining mechanism,
      (ii) each of said input waveguides being coupled to each of all but a last of said output waveguides via a respective switching mechanism and so via said respective combining mechanism, and
      (iii) said input waveguides being coupled to said last output waveguide only via said respective combining mechanism;
said input waveguides, said output waveguides said switching elements and said combining mechanisms all being arranged substantially in a common plane.

19. A method for switching signals from at least one input channel among a plurality of output channels, each output channel receiving signals from only one input channel, comprising the steps of:
   (a) providing an optical switch array including:
      (i) a plurality of input waveguides each of said input waveguides corresponding uniquely to one of the input channels,
      (ii) a plurality of output waveguides:
         (A) each of said output waveguides corresponding uniquely to one of the output channels,
         (B) all of said input waveguides being coupled to each of said output waveguides via a respective combining mechanism,
         (C) each of said input waveguides being coupled to each of all but a last of said output waveguides via a respective switching mechanism and also via said respective combining mechanism, and
         (D) said input waveguides being coupled to said last output waveguide only via said respective combining mechanism;
      said input waveguides, said output waveguides, said switching elements and said combining mechanisms all being arranged substantially in a common plane; and
   (b) for each of said output waveguides other than said last output waveguide:
      setting said switching element that couples said each output waveguide to said input waveguide that corresponds to the input channel wherefrom a signal is to be switched to the output channel corresponding to said each output waveguide to divert at least a portion of said signal to said each output waveguide.

20. A method for multicasting from at least one input channel to a plurality of output channels, each output channel receiving input from only one input channel comprising the steps of:

(a) providing an optical switch array wherein
   (i) all of the at least one input channel are coupled to each of the output channels via a respective combining mechanism,
   (ii) each of the at least one input channel is coupled to each of all but a last of the output channels via a respective switching mechanism and also via said respective combining mechanism, and
   (iii) all of the at least one input channel are coupled to said last output channel only via said respective combining mechanism; and (b) for each output channel other than said last output channel:
   setting said switching element, that couples said each output channel to the input channel wherefrom a signal is to be switched to said each output channel, to divert at least a portion of said signal to said each output channel, at least one of said switching elements being set to divert only a portion of said signal.

* * * * *